Feb. 26, 1952  E. CHAMAGNE ET AL  2,586,916
FREQUENCY CONTROL DEVICE
Filed April 16, 1948  3 Sheets-Sheet 1
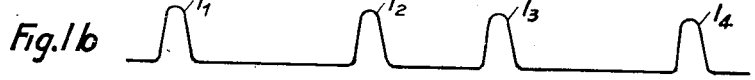
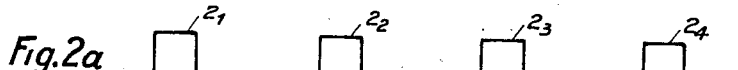
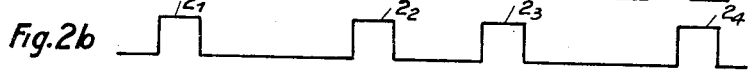
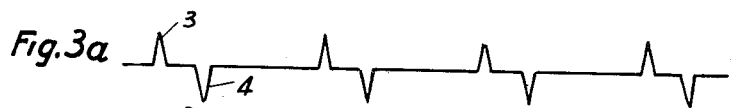
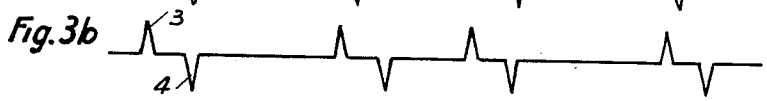
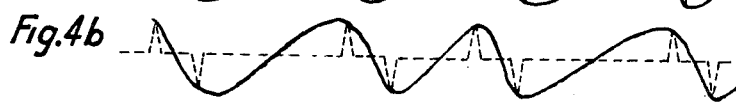
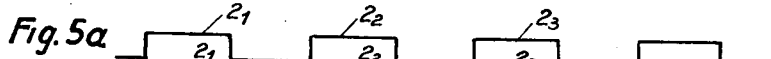
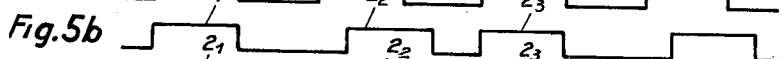
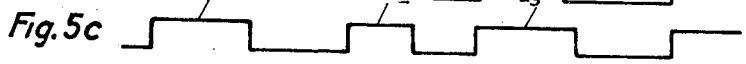
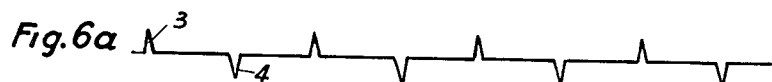
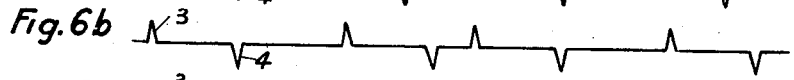
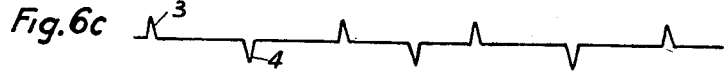
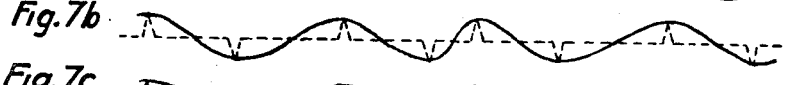

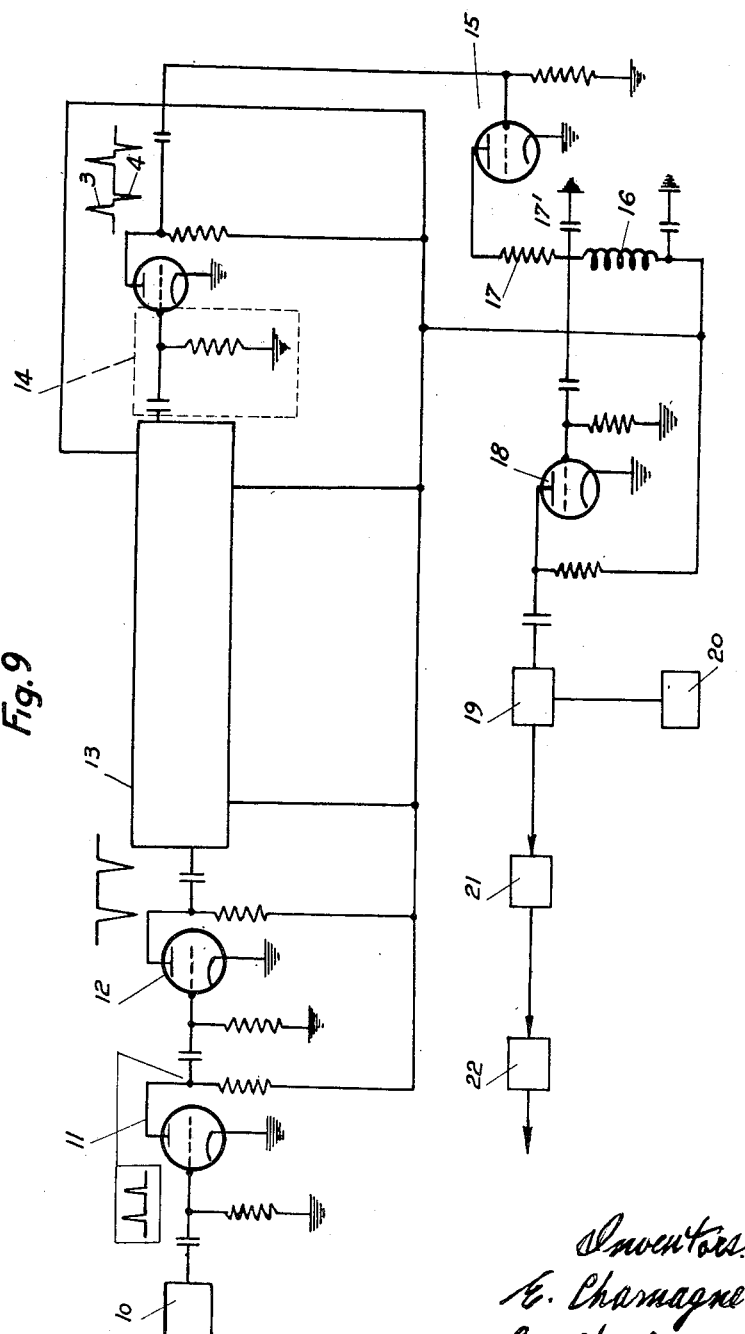

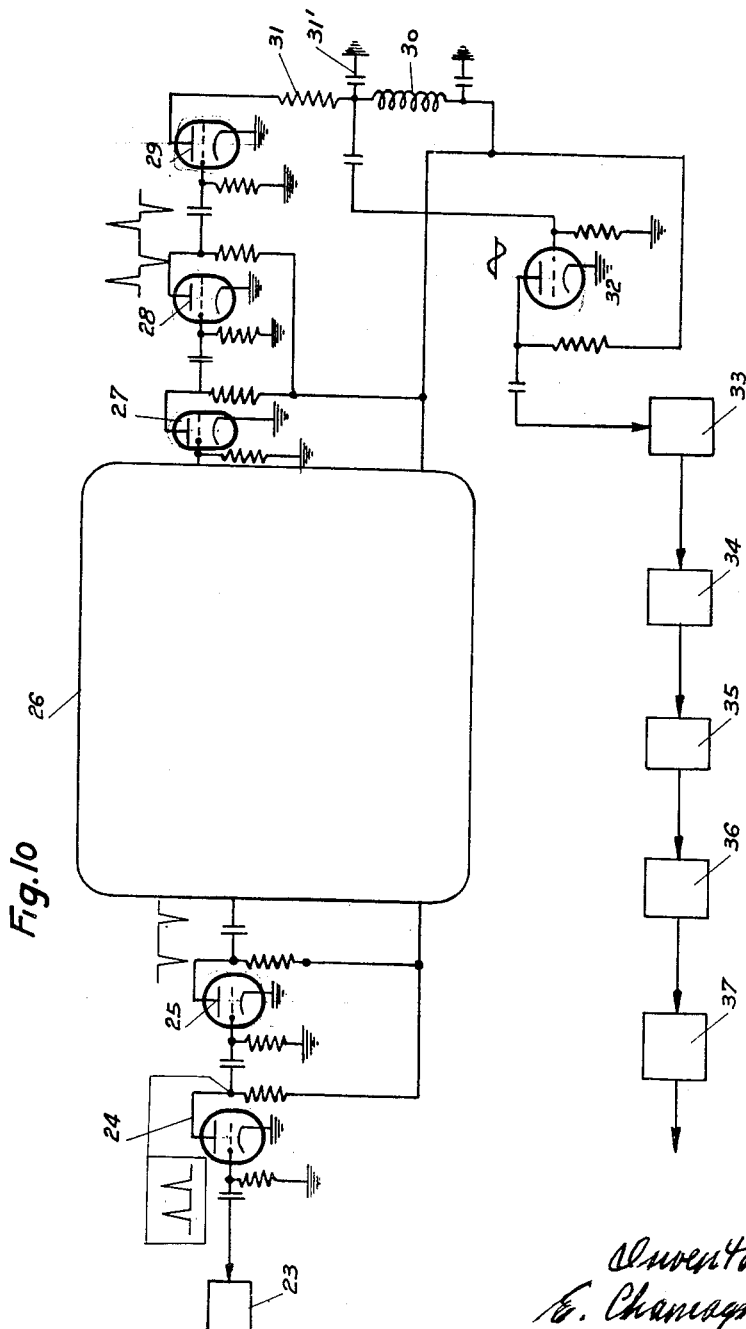

Patented Feb. 26, 1952

2,586,916

UNITED STATES PATENT OFFICE 2,586,916

FREQUENCY CONTROL DEVICE

Emile Chamagne, Paris, and André Charbonnier, Montmorency, France; said Chamagne assignor to Radiodiffusion Francaise, a French firm Application April 16, 1948, Serial No. 21,398
In France May 7, 1947

6 Claims. (Cl. 332—1)

Processes are already known for controlling the frequency of an oscillation by the frequency of recurrence of impulses, in which the said impulses are converted into impulses, which are absolutely identical with one another and are in the same relative positions as the incident impulses, with the aid of a multi-vibrator, and the converted impulses are then applied to an oscillatory circuit, each impulse exciting the said circuit so that the frequency obtained is a function of the interval between two successive impulses, that is to say that, if the incident impulses are equidistant, and therefore unmodulated or other than position-modulated, the oscillation obtained is a sinusoidal oscillation and, if the incident impulses are position-modulated, the oscillation obtained is a frequency-modulated oscillation.

These processes are applicable to the demodulation of position-modulated impulses, the frequency-modulated oscillation obtained being applied to the terminals of a discriminator as well as to the synchronization of wireless transmitters, the frequency of recurrence of the impulses other than position-modulated or the unmodulated impulses fixing the frequency of reference by which the frequency of the waves radiated by the synchronised stations is controlled. However, in these processes, the impulses are always of the same sign, so that the guiding of the oscillations by the said impulses is effected solely on the positive alternation. More often, deformations of the negative alternation result so that the sinusoidal or frequency-modulated wave is not pure; this creates distortions.

The object of the present invention is particularly to remedy the drawbacks resulting from insufficiency of the guiding of the oscillation by the impulses. For this purpose, it relates to a process for controlling the frequency of a sinusoidal oscillation or a frequency-modulated oscillation by the frequency of recurrences of impulses that are position-modulated or not, in which the said impulses are converted into a sinusoidal oscillation that is frequency-modulated or not, and this oscillation is then applied either to the terminals of a high-frequency multiplication and amplification chain in the case of the synchronisation of wireless transmitters, or to the terminals of a discriminator when it is frequency-modulated, the process being characterised by the fact that the incident impulses are differentiated so as to obtain, for each impulse, a positive surge followed by a negative surge, the said surges exciting an oscillatory circuit so that the positive surge serves to guide the positive alternation of the oscillation, whilst the negative surge serves to guide the negative alternation of the said oscillation, the oscillation thus generated being, at the same time, guided on its positive and negative alternations; this enables a pure wave without any distortion to be obtained.

According to one embodiment, the positive and and negative surges obtained by differentiating the impulses are integrated in an integration cell so that their bases are widened; this again enables the positive and negative alternations of the oscillation generated by the said surges to be better guided.

According to another embodiment, the positive and negative surges act upon an oscillatory circuit, the frequency proper of which is a multiple of the average frequency of the surges; this therefore enables a multiplication of the frequency to be effected directly from the said impulses.

The invention covers these processes, whatever be the devices for carrying them out.

However, the invention also covers a device which enables the foregoing processes and similar processes to be carried out particularly advantageously and efficaciously, this device being characterised by a multi-vibrator which is excited by the incident impulses, whether position-modulated or not, after inversion, this multi-vibrator supplying impulses which are identical with one another and of a fixed width and amplitude, but the position of which is identical with that of the exciting impulses, the impulses generated by the said multi-vibrator being differentiated in a derivation cell so as to obtain, for each impulse, a positive surge and a negative surge, the said surges being applied to an oscillator so as to generate, from the said surges, a sinusoidal oscillation, frequency-modulated or not, guided at the same time by the surges on its positive alternation and its negative alternation, and the said oscillation being sent either to the terminals of a high-frequency multiplication and amplification chain (synchronisation) or to the terminals of a discriminator (demodulation).

The invention also covers the features hereinafter described and their various possible combinations.

Processes and devices for synchronisation and demodulation, according to the invention, are represented by way of example in the accompanying drawings, of which Fig. 1 represents the received unmodulated impulses (Fig. 1a) or position-modulated impulses (Fig. 1b);

Fig. 2 represents the impulses produced by the multi-vibrator excited by the incident impulses of Fig. 1, Fig. 2a showing unmodulated incident impulses and Fig. 2b showing position-modulated incident impulses;

Fig. 3a and Fig. 3b represent the positive and negative surges obtained by differentiating the impulses of Figs. 2a and 2b;

Figs. 4a and 4b represent the sinusoidal or frequency-modulated oscillations obtained respectively by excitation of an oscillatory circuit by means of the surges of Figs. 3a and 3b;

Fig. 5a represents the unmodulated impulses given by the multi-vibrator, the width of the impulses being equal to half the distance separating two impulse fronts; Fig. 5b represents the position-modulated impulses given by the multi-vibrator, the width of the impulses being equal to half the distance separating two impulse fronts in the absence of position-modulation; Fig. 5c represents the position-modulated impulses given by the multi-vibrator, the width of the impulses being equal to half the distance separating two successive fronts of position-modulated impulses;

Figs. 6a, 6b and 6c represent the positive and negative surges obtained by differentiating the impulses of Figs. 5a, 5b and 5c;

Figs. 7a, 7b and 7c represent the sinusoids obtained by the action of the surges of Figs. 6a, 6b and 6c;

Fig. 8 represents the surges of Fig. 2 after integration;

Fig. 9 represents a device for demodulating position-modulated impulses; and

Fig. 10 represents a synchronising device installed in a secondary station to be synchronised.

The impulses $1^1$, $1^2$, $1^3$ and $1^4$, which are unmodulated (Fig. 1a) or position-modulated (Fig. 1b) synchronisation impulses are, after inversion, utilised for exciting a multi-vibrator which supplies, at the outlet, impulses $2^1$, $2^2$, $2^3$ and $2^4$ (Figs. 2a and 2b) which occupy the same positions as the impulses 1 but are absolutely identical with one another.

In the case of synchronisation, the incident impulses may be modulated otherwise than position-modulated, but the multi-vibrator gives, at the outlet, equidistant impulses free from modulation.

According to the invention, these impulses $2^1$, $2^2$, $2^3$ and $2^4$, which leave the multi-vibrator, are differentiated in a derivation cell so that each impulse gives rise to a positive vertical surge 3 followed by a negative vertical surge 4 (Figs. 3a and 3b). These successive surges 3 and 4, which correspond to each impulse 2, serve to excite an oscillatory circuit that produces an oscillation the frequency of which is a function of the interval between the impulses, so that the positive surges 3 guide the positive alternations of the oscillations, whilst the negative surges 4 guide the negative alternations of the same oscillation (Figs. 4a and 4b).

In the general case, the positive and negative surges correspond to a flank of the sinusoid generated. However, if the duration of the pulsations generated by the multi-vibrator is equal to half the space which separates two successive impulse fronts (Fig. 5a for synchronisation and Fig. 5c for position-modulation), the interval between the positive and negative surges 3 and 4 (Figs. 6a and 6c) is equal to half the period of the oscillation generated by the said surges, so that each surge takes place at homologous points of the positive and negative alternations corresponding substantially to the maximum positive and negative amplitudes of the oscillation generated (Figs. 7a and 7c). If the duration of the position-modulated pulsations generated by the multi-vibrator is equal to half the space separating two successive impulse fronts in the absence of modulation, the interval between the positive and negative surges 3 and 4 is approximately equal to one half period of the oscillation generated and the guiding takes place at substantially homologous points of the positive and negative alternations (Fig. 7b).

The guided wave obtained is then suitably multiplied and amplified before being directed towards the high-frequency part of the transmitter to be synchronised (case of a pure sinusoid and of synchronisation) or mixed with an auxiliary oscillation with a view to a change of frequency and the resulting beat oscillation applied to the terminals of a discriminator which gives the demodulated voltage to its terminals.

According to one embodiment, before applying the positive and negative surges 3 and 4 to the oscillatory circuit, the said surges are integrated so as to widen their bases; positive surges 6 and negative surges 7 with a larger base (Fig. 8) are thus obtained, rendering it possible to obtain a better guiding of the sinusoid generated by the said surges.

According to another embodiment, instead of generating one alternation by impulsion, a number of alternations can be generated in the same manner by impulsion in an oscillatory circuit the frequency proper of which is a multiple of the mean frequency of the surges, so that a true multiplication of frequency is obtained.

Fig. 9 represents a device for carrying out the process of frequency-control, forming subject matter of the invention, applied to the demodulation of position-modulated impulses, in which the said impulses are received by a receiver 10.

These impulses are then amplified by an amplifier 11 and then reversed in direction by a stage 12 so as to convert the positive impulses into negative impulses. The negative impulses, which leave the stage 12, are applied to the inlet of the multi-vibrator 13 of the aperiodic type.

At the outlet of the multi-vibrator, positive impulses, which are identical with one another and which have the same relative positions as the incident impulses, are obtained. These impulses are applied to a derivation circuit 14 at the outlet of which each impulse gives rise to a positive surge 3 and to a negative surge 4. These surges are applied to an oscillator 15 with an oscillatory circuit 16 and with an integration cell formed by the resistance 17 and the capacity 17', the latter also forming part of the oscillatory circuit 16. This integration cell widens the bases of the surges 3 and 4. The oscillation generated in 16 and frequency modulated is applied to the terminals of an amplifier 18 and then to a frequency-changer 19 which receives the auxiliary oscillation from the oscillator 20.

The beat oscillation set up at the outlet of the mixer 19 is applied to a discriminator 21 that gives the demodulated voltage which is then detected and amplified at 22.

Fig. 10 represents a device for carrying out the process of frequency-control, forming subject matter of the invention, applied to the synchronisation of transmitters by transmitting impulses, in which the said impulses are received by a receiver 23. These impulses are then amplified by an amplifier 24 and are then reversed in direction by a stage 25, so as to convert the positive impulses into negative impulses. The nega-tive impulses, which leave the stage 2b, are applied to the inlet of the multi-vibrator 26 of the aperiodic type.

At the outlet of the multi-vibrator, positive impulses which are identical with one another and which have the same relative positions as the incident impulses, are obtained. These impulses, which are amplified at 27, are applied to a derivation circuit 28 at the outlet of which each impulse gives rise to a positive surge 3 and to a negative surge 4. These surges are applied to an oscillatory circuit 30 of the oscillatory stage 29 through the intermediary of the integration cell formed by the resistance 31 and the capacity 31′, the latter also forming part of the oscillatory circuit 30. This integration cell widens the bases of the surges 3 and 4. The oscillation generated in 30 is amplified at 32 and 33, multiplied at 34 and 35 and, finally, amplified in the stages 36 and 37 before being transmitted to the high-frequency part in order to be employed as carrier wave. This device thus replaces the synchronised master oscillator usually to be found in transmitters.

What we claim is:

1. An arrangement for transforming a position-modulated pulsatory wave into a frequency-modulated wave comprising, in combination, a receiver for said waves, an amplifier, an inverter adapted to transform the positive pulses into negative pulses, a multivibrator released by said negative pulses and producing positive pulses identical with each other, the relative positions of which are the same as for the input pulses, derivation means at the output of which each pulse gives rise to a positive surge and a negative surge, an oscillatory stage the oscillation of which is started through the application of said surges and which produces an oscillation the frequency of which depends on the interval separating the two successive surges of the same sign, the said oscillation being guided on its positive and negative alternations.

2. An arrangement for transforming a position-modulated pulsatory wave into a frequency-modulated wave comprising, in combination, a receiver for said waves, an amplifier, an inverter adapted to transform the positive wave pulses into negative wave pulses, a multivibrator released by said negative pulses and producing positive pulses identical with each other the relative positions of which are the same as for the input pulses, a derivation cell at the output of which each pulse gives rise to a positive surge and a negative surge, an integrating cell and co-operating with said integrating cell adapted to widen the basis of the positive and negative surges, an oscillatory stage the oscillation of which is started through the application of said surges having such an enlarged basis and which produces an oscillation the frequency of which depends on the interval separating the two successive surges of the same sign, the said oscillation being guided on its positive and negative alternations.

3. An arrangement for transforming a position-modulated pulsatory wave into a frequency-modulated wave comprising, in combination, a receiver for said waves, an amplifier, an inverter adapted to transform the positive pulses into negative pulses, a multivibrator the operation of which is started through the passage of the front edges of the negative pulses and adapted to provide positive pulses the front edges of which have the same relative positions as the front edges of the negative pulses and have a width equal to one half the interval separating the front edges of two consecutive input pulses, a derivation cell at the output of which each pulse gives rise to a positive surge and a negative surge, an oscillatory stage the oscillation of which is started through the application of said surges and which produces an oscillation the frequency of which depends on the interval separating the two successive surges of opposite sign, the said oscillation being guided on its positive and negative alternations.

4. An arrangement for transforming equidistant pulses into a pure sinusoidal wave comprising, in combination, a receiver for said pulses, an amplifier, an inverter adapted to transform the positive pulses into negative pulses, a multivibrator released by said negative pulses adapted to provide positive pulses identical with each other the relative positions of which are the same as for the input pulses, derivation means at the output of which each pulse gives rise to a positive surge and a negative surge, an oscillatory stage the oscillation of which is started through the application of said surges and that produces an oscillation of constant frequency that is guided on its positive and negative alternations.

5. An arrangement for transforming equidistant pulses into a pure sinusoidal wave comprising, in combination, a receiver for said pulses, an amplifier, an inverter adapted to transform the positive pulses into negative pulses, a multivibrator released by said negative pulses adapted to provide positive pulses identical with each other the relative positions of which are the same as for the input pulses, a derivation cell at the output of which each pulse gives rise to a positive surge and a negative surge, co-operating with an intergration cell adapted to widen the basis of the positive and negative surges, an oscillatory stage the oscillation of which is started through the application of said surges having an enlarged basis and that produces an oscillation of constant frequency that is guided on its positive and negative alternations.

6. An arrangement for transforming equidistant pulses into a pure sinusoidal wave comprising, in combination, a receiver for said pulses, an amplifier, an inverter adapted to transform the positive pulses into negative pulses, a multivibrator released by said negative pulses and adapted to produce positive pulses the front edges of which have the same relative positions as the front edges of the negative pulses and have a width equal to one half the interval separating the front edges of two consecutive input pulses, a derivation cell at the output of which each pulse gives rise to a positive surge and a negative surge, an oscillatory stage the oscillation of which is started through the application of said surges and that produces an oscillation of constant frequency that is guided on its positive and negative alternations at the homologous points of each alternance.

EMILE CHAMAGNE.
ANDRÉ CHARBONNIER.

REFERENCES CITED

The following references are of record in the file of this patent:

UNITED STATES PATENTS

| Number | Name | Date |
| --- | --- | --- |
| 2,266,401 | Reeves | Dec. 16, 1941 |
| 2,425,315 | Atwood et al. | Aug. 12, 1947 |